Patented June 30, 1953

2,643,990

UNITED STATES PATENT OFFICE 2,643,990

METHOD OF PREPARING POLYMERS

George E. Ham, Dayton, Ohio, assignor, by mesne assignments, to The Chemstrand Corporation, a corporation of Delaware No Drawing. Application January 31, 1951, Serial No. 208,848

13 Claims. (Cl. 260—79.7)

This invention relates to a new method of preparing olefinic polymers and especially polymers of the various heterocyclic nitrogen-containing monomers. More particularly, the invention relates to preferred methods of preparing dyeable fiber-forming acrylonitrile polymers.

It is known that polyacrylonitrile and polymers of 80 or more per cent by weight of acrylonitrile are excellent fiber-forming compositions, but many of them are not sufficiently dye-receptive to enable their application in the preparation of general purpose fibers. Furthermore, it is known that various N-heterocyclic monomers will copolymerize with acrylonitrile and that the resulting copolymers are dye-receptive. Unfortunately many of the N-heterocyclic copolymers cannot be prepared by conventional polymerization methods, for example, those utilizing peroxy catalysts. Although non-oxidizing catalysts have been heretofore used to prepare polymers of vinylpyridine, for example azo-2,2'-diisobutyronitrile, they have been unstable and therefore difficult to store and use effectively. Furthermore, the azo-nitrile catalysts may cause serious irritation of workers' body surfaces.

The primary purpose of this invention is to provide a new and effective method of preparing copolymers of N-heterocyclic monomers. A still further purpose is to provide methods of preparing dyeable fiber-forming acrylonitrile polymers. Other purposes of the invention will be apparent from the subsequent disclosure, examples, and claims.

In accordance with this invention it has been found that diazoaminobenzene and the diazoaminobenzene derivatives containing alkyl, alkoxy, or halo substituents on the benzene ring may be used as catalysts for the preparation of polymers and copolymers of N-heterocyclic olefinic monomers. The catalysts which are used in accordance with this invention may be defined by the following structural formula:

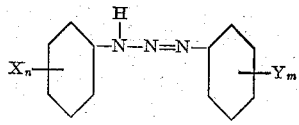

wherein X and Y are radicals of the group consisting of alkyl radicals having from one to four carbon atoms, the alkoxy radicals having from one to four carbon atoms, and halogen atoms, carboxylic acid, carboxylic acid salts, sulfonic acid, and sulfonic acid salt radicals, wherein $n$ and $m$ are integers from zero (0) to three (3). The substituents X and Y may be the same or different and when there is a plurality of substituents on a single ring these substituents may be the same or different.

Of the catalysts the unsubstituted diazoaminobenzene is the most important; however, numerous others are known and are equally effective in practicing the new invention. Other suitable compounds are:

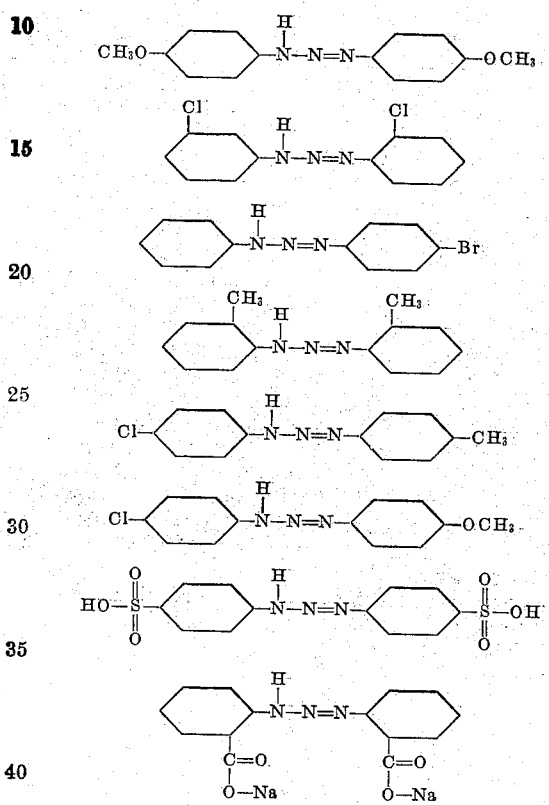

The new catalysts may be used in the same manner as are the prior art catalysts, by charging them directly into the reaction medium, or by dissolving them in a suitable solvent before adding. The catalysts may be added at the beginning of the reaction, or continuously or intermittently during the course of the reaction so as to provide a more nearly uniform concentration of the catalyst. In general from 0.01 to five per cent of catalyst based on the monomer weight may be used, but preferred practice utilizes from 0.5 to two per cent.

In the practice of this invention a wide variety of N-heterocyclic nitrogen compounds containing various olefinic functions may be polymerized. Suitable N-heterocyclic monomers are the imidazoles, benzimidazoles, imidazolines, oxazoles, benzoxazoles, thiazoles, benzothiazoles, pyridazines, pyrimidines, pyrazines, pyrazoles, pyrroles, triazines, quinolines, and pyridines, which contain olefinic unsaturation in a side chain. The unsaturation may be in an alkenyl radical substituted on either a carbon or nitrogen atom of the heterocycle. The unsaturated monomer may be an alkenyl ester of a carboxylic acid containing a N-hetero group, such as allyl nicotinate. It may be an N-alkenyl amide of a carboxy acid containing a N-hetero group, such as N-allyl picolinamide. It may be an alkenyl ether of a N-heterocyclic alcohol, such as vinyl 2-imidazolylmethyl ether. It may be an ester of an unsaturated acid and an N-heterocyclic alcohol, such as $\beta$-(2-pyridyl)ethyl acrylate. It may be an amide of an unsaturated acid having a N-hetero radical substituted on the amide nitrogen, such as N-2-oxazolyl methacrylamide.

Suitable monomers are the unsaturated imidazoles, for example, 1-allylimidazole, 2-isopropenylimidazole, 4(5)-vinylimidazole, 1-vinylimidazole, 1-methallylimidazole, vinyl 2-imidazolecarboxylate, allyl $\alpha$-(1-imidazolyl)acetate, methallyl 4(5)-imidazolecarboxylate, isopropenyl $\alpha$-(2-imidazolyl)acetate, N-allyl-2-imidazolecarboxamide, N-methallyl-N-methyl-$\alpha$-(1-imidazolyl)acetamide, N-vinyl-N-ethyl-1-methyl-4(5)-imidazolecarboxamide, $\beta$-(2-imidazolyl)ethyl acrylate, 4(5)-imidazolylmethyl methacrylate, $\beta$-(1-imidazolyl)ethyl acrylate, di-(2-imidazolylmethyl)maleate, N-(2-imidazolyl)acrylamide, N-(4-imidazolyl)methacrylamide, vinyl 1-methyl-4-imidazolylmethyl ether, allyl 2-imidazolylmethyl ether, methallyl-$\beta$-(1-imidazolyl)-ethyl ether, 1-acrylylimidazole, 1-methacrylylimidazole, and 1-vinyl-2-ethylimidazole.

Other suitable monomers are the unsaturated benzimidazoles, for example, 1-allylbenzimidazole, 2-vinylbenzimidazole, 1-methyllylbenzimidazole, isopropenyl 2-benzimidazolecarboxylate, vinyl 1-methyl 2-benzimidazolecarboxylate, allyl $\beta$-(1-benzimidazolyl)acetate, methallyl $\alpha$-(1-benzimidazolyl)propionate, N-allyl-N-methyl-2-benzimidazolecarboxamide, N-vinyl-$\alpha$-(1-benzimidazolyl)acetamide, N-methallyl-1-methyl-2-benzimidazolecarboxamide, vinyl 2-benzimidazolylmethyl ether, vinyl $\beta$-(1-benzimidazolyl)-ethyl ether, allyl 2-benzimidazolylmethyl ether, methallyl $\beta$-(2-benzimidazolyl)-ethyl ether, 2-benzimidazolylmethyl acrylate, $\beta$-(1-benzimidazolyl)ethyl methacrylate, N-(2-benzimidazolyl)acrylamide, N-(1-methyl-2-benzimidazolyl)methacrylamide, 1-acrylyl-benzimidazole, and 1-methacrylylbenzimidazole.

Other suitable monomers are the unsaturated imidazolines, for example, 1-vinylimidazoline, 1-allyl-2-ethylimidazoline, 2-vinyl-1-methylimidazoline, 4-isopropenylimidazoline, vinyl 2-imidazolinecarboxylate, allyl 1-imidazolinecarboxylate, methallyl $\alpha$-(1-imidazolidyl)acetate, isopropenyl 4-imidazolinecarboxylate, N-vinyl-N-methyl-1-methyl-2-imidazolinecarboxamide, N-allyl-1-imidazolinecarboxamide, N-methallyl-$\alpha$-(1-imidazolidyl)acetamide, N-isopropenyl-4-imidazolinecarboxamide, allyl 2-imidazolidyl methyl ether, methallyl 5-imidazolidylmethyl ether, (1-methyl-2-imidazolidyl)methyl methacrylate, $\beta$-(1-imidazolidyl)ethyl acrylate, N-(2-imidazolidyl)-N-methylacrylamide, N-(2-imidazolidyl)-methacrylamide, N-(4-imidazolidyl)acrylamide, 1-methacrylylimidazoline, and 1-acrylylimidazoline.

Other suitable monomers are the unsaturated oxazoles, for example, 4-vinyloxazole, 5-allyloxazole, 2-methallyloxazole, vinyl 2-oxazolecarboxylate, allyl $\alpha$-(2-oxazolyl)acetate, methallyl 4-oxazolecarboxylate, isopropenyl $\alpha$-(5-oxazolyl)propionate, N-allyl-2-oxazolecarboxamide, N-vinyl-N-methyl-$\alpha$-(4-oxazolyl)acetamide, N-methallyl-$\alpha$-(5-oxazolyl)propionamide, 2-oxazolylmethyl acrylate, $\alpha$-(4-oxazolyl)ethyl methacrylate, $\beta$-(5-oxazolyl)ethyl acrylate, vinyl 2-oxazolylmethyl ether, allyl $\beta$-(4-oxazolyl)ethyl ether, N-(2-oxazolyl)acrylamide, and N-(4-oxazolyl)methacrylamide.

Additional suitable monomers are the unsaturated benzoxazoles, for example, 2-allylbenzoxazole, 5-vinylbenzoxazole, 7-isopropenyl benzoxazole, vinyl 2-benzoxazolecarboxylate, allyl $\alpha$-(2-benzoxazolyl)acetate, methallyl 6-benzoxazolecarboxylate, N-allyl-2-benzoxazolecarboxamide, N-methallyl-$\alpha$-(2-benzoxazolyl)-acetamide, N-vinyl-N-methyl-6-benzoxazolecarboxyamide, 2-benzoxazolylmethyl acrylate, $\beta$-(2-benzoxazolyl)ethyl methacrylate, allyl 2-benzoxazolylmethyl ether, vinyl $\beta$-(2-benzoxazolyl)ethyl ether, N-(2-benzoxazolyl)acrylamide, and N-(2-benzoxazolyl)methacrylamide.

Further suitable monomers are the unsaturated benzothiazoles, for example, 2-vinylbenzothiazole, 2-allylbenzothiazole, 2-methallylbenzothiazole, 2-vinylmercaptobenzothiazole, 2-isopropenylmercaptobenzothiazole, 2-vinyloxybenzothiazole, 2-allyloxybenzothiazole, allyl 2-benzothiazolecarboxylate, methallyl 4-methyl-2-benzothiazolecarboxylate, vinyl 2-benzothiazolecarboxylate, N-allylbenzothiazole-2-carboxamide, $\beta$-(2-benzothiazolyl)ethyl acrylate, 2-allylmercaptobenzothiazole, 2-benzothiazolylthiol acrylate, and 2-benzothiazolylthinol methacrylate.

Still further suitable monomers are the unsaturated pyridazines, for example, 4-vinylpyridazine, 3-vinylpyridazine, 3-allylpyridazine, 3-methallylpyridazine, allyl 3-pyridazinecarboxylate, vinyl 4-pyridazinecarboxylate, N-allyl-3-pyridazinecarboxamide, $\beta$-(4-pyridazinyl)ethyl acrylate, allyl 3-pyridazinyl ether, N-(3-pyridazinyl)methacrylamide, N-(3-pyridazinyl)-maleimide, and vinyl 4-pyridazinyl ether.

More suitable monomers are the unsaturated pyrimidines, for example, 2-vinylpyrimidine, 4-vinylpyrimidine, 5-vinylpyrimidine, 2-allylpyrimidine, 4-methallylpyrimidine, allyl pyrimidine-2-carboxylate, vinyl pyrimidine-4-carboxylate, N-allylpyrimidine-4-carboxamide, $\beta$-(4-pyrimidinyl)ethyl acrylate, allyl 4-pyrimidinyl ether, N-(4-pyrimidinyl)methacrylamide, N-(4-pyrimidinyl)maleimide, allyl 4-pyrimidinylmethyl ether, and vinyl $\beta$-(2-pyrimidinyl)-ethyl ether.

Additional suitable monomers are the unsaturated pyrazines, for example, vinylpyrazine, isopropenylpyrazine, allylpyrazine, methallylpyrazine, allyl pyrazinecarboxylate, vinyl pyrazinecarboxylate, N-allylpyrazinecarboxamide, $\beta$-(pyrazinyl)ethyl acrylate, allyl pyrazinyl ether, vinyl pyrazinylmethyl ether, N-pyrazinylmethacrylamide, and N-pyrazinylmaleimide.

Other suitable monomers are the unsaturated pyrazoles, for example, 1-vinylpyrazole, 1-allylpyrazole, 1-methallylpyrazole, 3-vinyl-1-methylpyrazole, 3-allyl-1-methylpyrazole, allyl 1-methyl-3-pyrazolylcarboxylate, N-allyl-1-methylpyrazole-3-carboxamide, 1-methacrylylpyrazole, and 4-methallyl pyrazole.

Further suitable monomers are the unsaturated pyrroles, for example, 1-vinylpyrrole, 1-methyl-2-vinylpyrrole, 1-allyl-pyrrole, 1-methallylpyrrole, and 1-methyl-3-allylpyrrole.

Other suitable monomers are the unsaturated triazines, for example, 2-vinyl-s-triazine, 2-allyl-s-triazine, 2-allyl-4-methyl-s-triazine, 2-isopropenyl-s-triazine, β-(s-triazinyl)-ethyl acrylate, vinyl β-(s-triazinyl)ethyl ether, allyl s-triazinylmethyl ether, allyl 2-s-triazinecarboxylate, and N-allyl-2-s-triazinecarboxamide.

Further suitable monomers are the unsaturated quinolines, for example, 2-vinylquinoline, 3-isopropenylquinoline, 4-allylquinoline, 5-methallylquinoline, allyl α-(6-quinolyl) acetate, isopropenyl-7-quinolinecarboxylate, methallyl α-(8-quinolyl) propionate, vinyl 2-quinolinecarboxylate, N-allyl 2-quinolinecarboxamide, N-vinyl-α-(3-quinolyl)acetamide, N - methallyl-N-ethyl-4-quinolinecarboxamide, N - isopropenyl - 7-quinolinecarboxamide, 8-quinolyl acrylate, β-(6-quinolyl)ethyl methacrylate, 5-quinolylmethyl acrylate, vinyl 8-quinolyl ether, allyl β-(2-quinolyl) ethyl ether, methallyl 4-quinolylmethyl ether, N-(2-quinolyl)acrylamide, and N-(8-quinolyl)-N-methyl methacrylamide.

Other suitable monomers are the unsaturated pyridines, for example, 2-allylpyridine, 3-isopropenylpyridine, 4-methallylpyridine, vinyl nicotinate, allyl isonicotinate, methallyl picolinate, N-isopropenylpicolinamide, N-allylnicotinamide, N-methallyl-N-methylisonicotinamide, β - (2 - pyridyl)ethyl acrylate, di - (3 - pyridylmethyl) maleate, di-(4-pyridylethyl)fumarate, di-(2-pyridylmethyl) itaconate, β-(4-pyridyl)ethyl methacrylate, vinyl β-(2-pyridyl)ethyl ether, allyl 4-pyridylmethyl ether, methallyl β-(3-pyridyl) ethyl ether, N-(2-pyridyl)-methacrylamide, N-(3-pyridyl)-N - methylacrylamide, di - N,N - (4-pyridyl)fumaramide, N - (2 - pyridyl-maleimide, and α-propenylpyridine.

Additional monomers suitable are the unsaturated thiazoles, for example, 2-vinylthiazole, 4-allylthiazole, 5-methallylthiazole, 2-isopropenylthiazole, allyl thiazole-2-carboxylate, vinyl thiazole-2-carboxylate, allyl thiazole, 4-carboxylate, N-allylthiazole-2-carboxamide, N - methallylthiazole-2-carboxamide, β-(2-thiazolyl)ethyl acrylate, di-(2-thiazolylmethyl) itaconate, vinyl β-(2-thiazolyl)ethyl ether, allyl 2-thiazolylmethyl ether, N - (2 - thiazolyl)methacrylamide, N - (4-thiazolyl)-N-methylacrylamide, N - (2-thiazolyl) maleimide, and 2-vinylmercaptothiazole.

Other monomers suitable are the lactams, for example, 1-vinylpyrrolidone, 1-allylpyrrolidone, 1 - methallylpyrrolidone, 1 - vinylpiperidone, 1-allylpiperidone, 1-methallylpiperidone, 1-allyl-4-methylpiperidone, N-vinylcaprolactam, 1-vinyl-5-pyrazolone, 1-methyl-3-vinyl-5-pyrazolone, 1-methallyl - 5 - pyrazolone, 1 - methyl - 3-allyl-5-pyrazolone, and 4-vinyl-5-pyrazolone.

The new method is effective in polymerizing the above-described N-heterocyclic monomers either by themselves without comonomers, mixtures of one or more of the above-described monomers, or mixtures of any one or more with other polymerizable olefinic compounds. Since the purpose for which the N-heterocyclic monomers are prepared is to effect improved dye-receptivity in fiber-forming copolymers, a preferred group of copolymers are those of from 80 per cent to 98 per cent of acrylonitrile and from two per cent to 20 per cent of one or more of the N-heterocyclic monomers. The same improvement in dye-receptivity may be achieved by blending N-heterocyclic polymers with polyacrylonitrile or with a similar non-dyeable copolymer of 80 or more per cent of acrylonitrile with other olefinic monomers copolymerizable therewith. Since polymers of the N-heterocyclic monomers or of mixtures thereof may be also used to modify the fiber-forming acrylonitrile polymers by blending, any proportion of the N-heterocyclic monomer bearing from two to 100 per cent may be polymerized. In the preparation of the blending polymers a wide variety of comonomers may be used, including vinyl acetate, vinyl chloride, vinylidine chloride, methacrylonitrile, styrene, α-methylstyrene, and the alkyl acrylates and the alkyl methacrylates, the alkyl maleates, and the alkyl fumarates, wherein the alkyl radicals are from one to four carbon atoms. These same comonomers may be copolymerized with acrylonitrile to form the non-dyeable base polymer for blending with the N-heterocyclic polymer.

In the preparation of the copolymers by polymerization in the presence of diazominobenzene or derivatives thereof as defined, a wide variety of conventional procedures may be used. Although mass polymerizations and solution polymerizations may be used, it has been found preferable to utilize polymerization in an aqueous medium, under conditions selected so that the monomers being polymerized and the copolymers formed are dispersed or emulsified in the aqueous medium. These optimum conditions may be obtained by a variety of methods.

If desired, the polymerization may be conducted by a batch process reaction in which all of the monomers, the aqueous medium, the emulsifying or dispersing agent and the catalysts are charged to the reactor or autoclave at the outset of the reaction and the procedure initiated by heating to the required temperature. Temperatures between 50° C. and 150° C. may be used, but it has been found that temperatures of from 80° C. to 100° C. are most effective for a practicable readily controllable reaction. The autoclave or other reactor must provide for a thorough mixing of reagents and dispersion of the reactor contents, which may be achieved by a mechanical stirring apparatus, or by rocking or tumbling the reactor. When the reaction is complete, the polymer is separated from the aqueous phase and the unreacted monomers removed by conventional procedures.

The new method may also be conducted in a semi-continuous manner by gradually adding the monomeric substance during the course of the reaction to an aqueous medium in which the essential conditions of polymerization are maintained. Since the optimum reaction temperatures are in some cases above the usual reflux temperature of the reaction medium, it may be desirable to maintain slight positive pressures in the reaction vessel. Operation at reflux temperature permits rapid removal of heat of polymerization and the maintenance of more uniform conditions of reaction. As a result the chemical and physical properties of the polymer are more uniform and the polymers more readily spinnable by conventional methods.

The type of polymerization will depend to some extent upon the selection of the monomers to be polymerized, the proportions of N-heterocyclic monomer present in the reaction vessel, and the type of emulsion or dispersing agent used in the reaction. When the fiber-forming copolymers are prepared utilizing from 85 per cent to 98 per cent of acrylonitrile with minor proportions of the N-heterocyclic monomers, it has been found that dispersing agents, such as the alkali metal salts of sulfonated alkylbenzenes, or the alkali metal salts of the formaldehyde condensed naphthalenesulfonates may be used effectively. In the preparation of the polymers of the N-heterocyclic nitrogen monomers or copolymers containing more than 15 per cent of a N-heterocyclic monomer, it is usually desirable to use a stabilizing agent of the true emulsifier type, for example, sodium stearate, or other alkali metal salts of fatty acids or mixtures of fatty acids as obtained by the saponification of animal or vegetable oils. In general any emulsifier dispersion agent, or wetting agent having both hydrophobic and hydrophilic functional groups will be useful in the practice of this invention.

Further details of this invention are set forth with respect to the following examples:

Example 1

A mixture of 25 parts of acrylonitrile, 25 parts of N-vinylimidazole, 100 parts of water, two parts of sodium stearate, and 0.5 part of diazoaminobenzene was charged to a pressure vessel. After flushing with nitrogen the vessel was sealed and placed in a tumbling oven. The vessel and its contents were maintained at 90° C. for 16 hours. The polymer recovered after washing the reaction mixture with water was mixed with N,N-dimethylacetamide to form a ten per cent (dry solids) solution. Residual moisture was removed by heating the solution in an oil bath, at eight mm. total pressure, in which the oil was maintained at 155° C.

The resulting solution was mixed with a copolymer of 97 per cent of acrylonitrile and three per cent of vinyl acetate, and additional N,N-dimethylacetamide, to form a blend of 15 per cent solids (88 per cent of the 97:3 polymer and 12 per cent of the N-vinylimidazole polymer). The solution was extruded through a spinneret having 30 apertures each 0.005 inch in diameter into a coagulating mixture of 60 per cent dimethylacetamide and 40 per cent of water.

The fiber was washed continuously with water, dried on a steam heated drum and stretched 276 per cent in a 50 pounds per square inch steam atmosphere. The fiber was found to have a tenacity of 3.9 grams per denier, an elongation of 7.0 per cent, and a boil shrinkage of 7.5 per cent. The fiber developed brilliant scarlet color when dyed in a dyebath containing 41 grams of water, 0.1 gram of sulfuric acid, and 0.02 gram of Wool Fast Scarlet Dye for each gram of fiber. When both the standard dyebath and with one containing five times as much dye, essentially complete dyebath exhaustion was obtained in one hour at 100° C.

Example 2

Using the procedure described in the preceding example, 50 parts by weight of acrylonitrile, 50 parts of 2-vinylpyridine, 200 parts of water, one part of sodium stearate, and 0.5 part of diazoaminobenzene were charged to a reaction vessel with a tightly fitting cap. The vessel and its contents were then heated at 90° C. for 18 hours. The reaction mixture so obtained was poured into an equal volume of 50 per cent of aqueous ethanol. The polymer was separated from the aqueous solution by decanting, then dissolved in approximately three volumes of N,N-dimethylacetamide and then re-precipitated in the 50 per cent aqueous ethanol solution.

A polymer blend was prepared using twelve per cent of the copolymer described in the previous paragraph with 88 per cent of a copolymer of 97 per cent of acrylonitrile and three per cent of vinyl acetate. This blend was dissolved to the extent of 18 per cent in N,N-dimethylacetamide. The fibers prepared from this polymer in the manner described in the preceding example were stretched 266 per cent and found to be light in color, possessed of a tenacity of 3.3 grams per denier, and had an elongation of six per cent and a boil shrinkage of 7.5 per cent. The fibers were found to have excellent dye receptivity for Wool Fast Scarlet Dye, exhausting the dyebath in one hour.

Example 3

Using the procedure described in Example 1, a copolymer of 50 per cent of acrylonitrile and 50 per cent of 2-vinylmercaptobenzothiazole was prepared. The emulsion so obtained was coagulated by freezing, filtered, washed with alcohol, and dried for 18 hours at 40° C. in a vacuum oven.

Example 4

Two mixtures each containing 25 parts by weight of acrylonitrile, 25 parts of N-vinylimidazole, and 100 parts of distilled water were prepared in separate closed reaction vessels. One vessel was charged with an additional 0.5 part of diazoaminobenzene. Both vessels were closed and heated in a tumbling oven for five hours at 90° C. The reaction mixture containing the diazoaminobenzene was substantially completely polymerized, whereas the other reaction mixture showed no evidence of polymerization.

Example 5

A reaction vessel with a tight fitting stopper was charged with 95 parts by weight of acrylonitrile and five parts of N-vinylimidazole, 1.0 part of diazoaminobenzene, and 200 parts of water. The vessel was placed in a tumbling oven for 18 hours. A substantial yield of copolymer was thereby obtained which was separated by filtration and washed with water.

Example 6

Using the procedure described in the preceding experiments a copolymer of 92 per cent of acrylonitrile and eight per cent of vinylpyridine was prepared in a yield of 87.2 per cent. The polymer was found to have a specific viscosity of 0.192 per cent. Fibers spun and stretched 280 per cent as in Example 1 from an 18 per cent solution in dimethylacetamide were found to possess a tenacity of 3.5 grams per denier, an elongation of from seven to ten per cent, and a boil shrinkage of 11.4 per cent. Complete dyebath exhaustion was obtained with Wool Fast Scarlet dye at two and ten per cent concentrations when dyed as in Example 1.

Example 7

A fiber-forming polymer was also prepared using 92 parts by weight of acrylonitrile and eight parts of 2-vinylquinoline by the method described in the preceding experiments.

Example 8

A solution of 75 parts of N-vinylimidazole, 25 parts of acrylonitrile and 1.0 part of diazoaminobenzene was added continuously over a 2.5 hour addition period at 93° C. to a solution of 400 parts of distilled water and two parts of Ivory Snow contained in a 2-liter, 3-necked, round-bottomed flask fitted with a stirrer, reflux condenser, thermometer, and two dropping funnels. After addition of the monomer was complete, the mixture was allowed to reflux for one-half hour during which time the reflux temperature rose to 96° C. The unreacted acrylonitrile was steam-distilled and the mixture was cooled. The copolymer was separated by decantation and washed thoroughly with water. The wet polymer was dried in a vacuum oven at 55° C. for 48 hours. A good conversion to copolymer was obtained.

The invention is defined by the following claims.

What I claim is:

1. A method of preparing polymers which comprises heating a compound containing an N-heterocyclic radical and a polymerizable mono-olefinic radical in the presence of a compound of the structure:

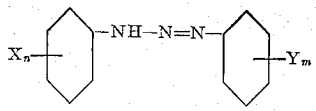

wherein X and Y are radicals selected from the group consisting of the halogen radicals, and the alkoxy and alkyl radicals having up to four carbon atoms, carboxyl radical, and salts thereof, sulfo radical, and salts thereof, and $n$ and $m$ are integers from zero (0) to three (3), and wherein all polymerizable material present are mono-olefinic.

2. A method of preparing polymers which comprises heating a compound having a nucleus selected from the class consisting of pyridines, quinolines, imidazoles, benzimidazoles, imidazolines, oxazoles, benzoxazoles, thiazoles, benzothiazoles, pyridazines, pyrimidines, pyrazines, pyrazoles, pyrroles, triazines, and lactams, and a mono-olefinic side chain selected from the group consisting of

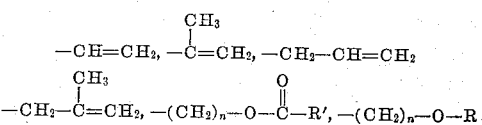

and

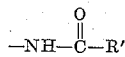

wherein $n$ is an integer from one to two, inclusive, R' is a radical of the group consisting of

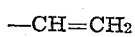

and

and R is a radical of the group consisting of

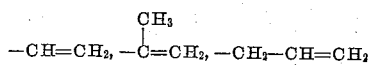

and

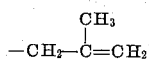

in the presence of a compound of the structure:

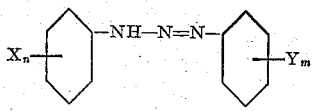

wherein X and Y are radicals selected from the group consisting of the halogen radicals, and the alkoxy and alkyl radicals having up to four carbon atoms, carboxyl radical, and salts thereof, sulfo radical, and salts thereof, and $n$ and $m$ are integers from zero (0) to three (3), and wherein all polymerizable materials present are mono-olefinic.

3. A method of preparing polymers of a monomeric composition of which at least two per cent by weight of the total polymerizable content is a compound containing an N-heterocyclic radical and a polymerizable mono-olefinic radical which comprises heating the said monomeric composition in the presence of a compound of the structure:

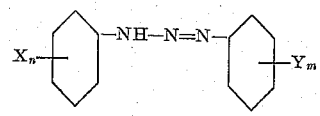

wherein X and Y are radicals selected from the group consisting of the halogen radicals, and the alkoxy and alkyl radicals having up to four carbon atoms, carboxyl radical, and salts thereof, sulfo radical, and salts thereof, and $n$ and $m$ are integers from zero (0) to three (3), and wherein all polymerizable materials present are mono-olefinic.

4. A method of preparing a copolymer of from 80 per cent to 98 per cent of acrylonitrile and from two to 20 per cent by weight of the total polymerizable content of a compound containing an N-heterocyclic radical and a polymerizable mono-olefinic radical, which comprises heating the monomeric composition in the presence of a compound of the structure:

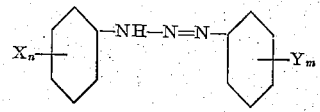

wherein X and Y are radicals selected from the group consisting of the halogen radicals, and the alkoxy and alkyl radicals having up to four carbon atoms, carboxyl radical, and salts thereof, sulfo radical, and salts thereof, and $n$ and $m$ are integers from zero (0) to three (3), and wherein all polymerizable materials present are mono-olefinic.

5. A method of preparing polymers of a monomeric composition of which at least 20 per cent by weight of the total polymerizable content is a compound containing an N-heterocyclic radical and a polymerizable mono-olefinic radical, and up to 80 per cent is a non-heterocyclic mono-olefinic monomer, which comprises heating the said monomeric composition in the presence of a compound of the structure:

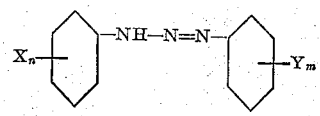

wherein X and Y are radicals selected from the group consisting of the halogen radicals, and the alkoxy and alkyl radicals having up to four carbon atoms, carboxyl radical, and salts thereof, sulfo radical, and salts thereof, and $n$ and $m$ are integers from zero (0) to three (3), and wherein all polymerizable materials present are mono-olefinic.

6. The method defined by claim 1 wherein the polymerization is conducted in the presence of water.

7. The method defined by claim 2 wherein the polymerization is conducted in the presence of water.

8. The method defined by claim 1 wherein the diazo compound is present to the extent of from 0.01 to five per cent of the total monomer.

9. The method defined by claim 2 wherein the diazo compounds is present to the extent of from 0.01 to five per cent of the total monomer.

10. The method defined by claim 1 wherein the diazo compound is diazoaminobenzene.

11. The method defined by claim 10 wherein the diazoaminobenzene is present to the extent of from 0.5 to 2% of the total monomer.

12. The method defined by claim 2 wherein the diazo compound is diazoaminobenzene.

13. The method defined by claim 12 wherein the diazoaminobenzene is present to the extent of from 0.5 to 2% of the total monomer.

GEORGE E. HAM.

References Cited in the file of this patent

UNITED STATES PATENTS

| Number | Name | Date |
|---|---|---|
| 2,460,567 | Browning | Feb. 1, 1949 |